1,550,802

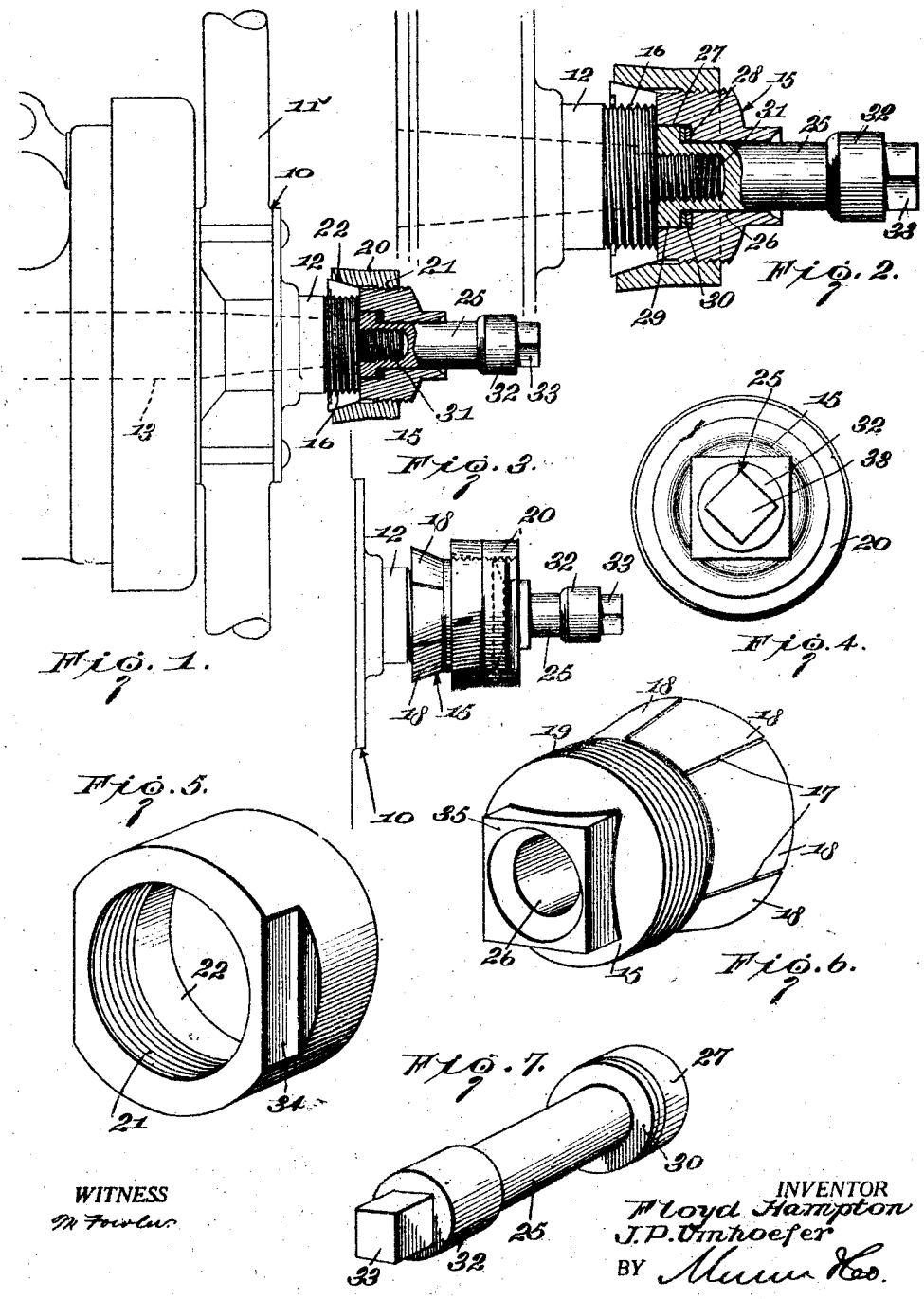
Aug. 25, 1925.　　　F. HAMPTON ET AL　　　1,550,802
WHEEL PULLER
Filed April 25, 1924
INVENTOR
Floyd Hampton
J. P. Umhoefer
BY
ATTORNEYS Patented Aug. 25, 1925.

UNITED STATES PATENT OFFICE.

FLOYD HAMPTON AND JOHN P. UMHOEFER, OF ALBUQUERQUE, NEW MEXICO.

WHEEL PULLER.

Application filed April 25, 1924. Serial No. 708,978.

*To all whom it may concern:*

Be it known that we, FLOYD HAMPTON and JOHN PETER UMHOEFER, citizens of the United States, and residents of Albuquerque, in the county of Bernalillo and State of New Mexico, have invented certain new and useful Improvements in Wheel Pullers, of which the following is a specification.

This invention relates to an improvement in wheel pullers especially designed for use with automobiles.

The object of the invention is to provide a wheel puller of this character which may be conveniently used to quickly and readily pull a wheel from the axle of an automobile or the like without danger of distorting the parts of the wheel puller or the parts of the wheel and axle assembly of the vehicle.

A further object is to provide a wheel puller of this character and having the foregoing enumerated advantages and capacities and which is also of simple and durable construction, reliable and effective in operation and comparatively inexpensive to manufacture.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a view, showing a wheel puller embodying the present invention applied to the wheel and axle assembly of the vehicle, the wheel and axle assembly being illustrated in fragmentary elevation and the wheel puller being shown partly in diametrical section and partly in elevation and with its elements positioned to remove the wheel;

Figure 2 is a view similar to Figure 1, but showing the parts of the wheel puller as positioned after the wheel has been removed;

Figure 3 is a fragmentary view in elevation of the wheel puller and the wheel and axle assembly and showing the parts as positioned just prior to locking the hub casing on the hub;

Figure 4 is a view in front end elevation;

Figure 5 is a detail perspective view of the lock nut for the hub casing;

Figure 6 is a similar view of the hub casing; and

Figure 7 is a similar view of the operating shaft.

Referring to the drawings, wherein for the sake of illustration is shown the preferred embodiment of the invention, the numeral 10 designates generally the wheel and axle assembly of a "Ford" automobile. At this point it is to be understood that while the embodiment of the invention illustrated is particularly designed for use with "Ford" and "Chevrolet" automobiles that the invention is adapted for pulling the wheel of practically all automobiles and similar vehicles except those having full floating axles. In the wheel and axle assembly illustrated the wheel to be pulled is designated at 11 and has an externally threaded hub 12. The axle is designated at 13 and is also externally threaded at its outer end.

The wheel puller which constitutes the present invention comprises a casing 15 having one end open and internally threaded, as at 16, the internal threads 16 of the casing 15 being engageable with the external threads of the hub 12 of the wheel after the hub cap has been removed. The portion of the casing 15 which is engageable with the hub 12 of the wheel is provided with a plurality of longitudinal slits or cuts 17 providing resilient sections 18 of the hub casing 15. These slits 17 extend from a point approximately midway of the casing 15 to one end of the casing. Between the opposite end of the casing and the slits the outer periphery of the casing is externally threaded as at 19. As shown in the drawings the outer periphery of that portion of the casing made up of the sections 18 is smooth but is inclined, as shown to advantage in Figures 1, 2 and 3. A lock nut 20 is provided and has a portion of its inner periphery internally threaded, as at 21, the internal threads 21 of the lock nut being engageable with the external threads 19 of the casing when the lock nut is assembled therewith. The inner periphery of the lock nut is also provided with a smooth portion 22 having an opposite inclination with respect to the smooth portion of the casing 15 made up by the sections 18 and designed to coact with such smooth portion of the casing 15 to contract the sections 18 and bind the threads 16 of the casing 15 in positive and secure engagement with the threads of the hub of the wheel thereby preventing the puller from stripping the threads of the hub.

An operating shaft 25 is provided and is rotatably mounted in a bearing 26 provided therefor in the casing 15, the bearing 26 extending axially of and entirely through said casing 15. In order to limit the movement of the shaft 25 axially of the casing 15 in a direction away from the wheel when the wheel puller is assembled with the wheel and axle assembly, the casing 15 is recessed, as at 27, at one end to provide a shoulder 28, and the shaft 25 is formed at one end with a shoulder 29, the recess 27 and shoulder 29 being of annular form and the shoulder 29 snugly but rotatably fitting in the recess 27. Of course it is to be understood that the shoulders 28 and 29 coact to limit the movement of the shaft 25 in the manner indicated but in lieu of having these parts directly engage each other washers 30 are mounted on the shaft 25 and interposed between the same. One end of the shaft 25 is formed with an internally threaded socket 31 designed to engage the threaded end of the axle 13 of the vehicle from which the wheel is to be pulled. In order to prevent the shaft 25 from falling or dropping from the casing 15 when the parts are being handled, a collar 32 may be shrunk or otherwise suitably secured on the shaft. The end of the shaft 25 opposite the socket 31 is squared or otherwise adapted for coaction with a wrench or other suitable tool, the squared end being designated at 33.

The lock nut 20 is also formed with plane faces 34 to facilitate returning of the lock nut by means of a wrench or the like. Also the casing 15 is formed with a polygonally shaped boss 35 for a similar purpose.

In using the wheel puller the lock nut 20 is first backed off the casing 15, as shown in Figure 3, so that the sections 18 of the casing are expanded. With the parts so positioned the shaft 25 is brought up to the axle and is turned to the right so that the threads of its socket 31 engage the threaded end of the axle 13 as far as they may, this arrangement, except for the position of the lock nut, being shown in Figure 1. The casing 15 is then turned so as to bring its threads 16 into engagement with the threads of the hub 12, after which the lock nut 20 is turned on the casing until it moves from the position shown in Figure 3 to the position shown in Figure 1 whereby the casing 15 is firmly and securely connected to the hub. A wrench or other suitable tool is then engaged with the squared end 33 of the shaft 25 and this shaft is given a quarter turn or more as may be required to the left. This immediately forces the wheel from the axle without subjecting any parts to strains or stresses liable to distort or otherwise injure the same.

From the foregoing it will be understood that the wheel puller may be conveniently and quickly applied to the wheel and axle assembly or taken therefrom. Moreover the device may be used to quickly and easily remove the wheel from the axle without danger of injuring any of its parts or any of the parts of the wheel and axle assembly.

We claim:

1. A puller for use in pulling wheels from axles and comprising a casing having internal threads engageable with the hub, said casing being split longitudinally into resilient sections, a lock nut threaded on the casing and adapted to contract the sections to engage the casing and hub tightly, and a shaft rotatably mounted on the casing and having an internally threaded socket engageable with the axle.

2. A wheel puller for use in pulling wheels from axles and comprising a casing having internal threads engageable with the hub, said casing having a portion split longitudinally into resilient sections and provided with a smooth and inclined outer periphery and also having a portion externally threaded, a lock nut having a portion internally threaded and cooperable with the externally threaded portion of the casing, said lock nut also having a portion of its inner periphery smooth and engageable with the smooth and inclined portion of the outer periphery of the casing, the smooth portion of the lock nut being oppositely inclined with respect to the smooth portion of the casing, and a shaft rotatably mounted on said casing, said shaft and said casing being constrained to partake of corresponding axial movement in a direction away from said wheel, said shaft having an internally threaded socket engageable with the axle and also having means whereby it may be turned.

3. A puller for use in pulling wheels from axles comprising a casing having a portion adapted to be pressed into engagement with the hub, means for pressing said portion into engagement, a shaft mounted in the casing for rotary movement and having an internally threaded socket adapted for threaded engagement with the axle, and interengaging means on the shaft and casing for constraining the shaft and casing to partake of corresponding axial movement in a direction away from the wheel.

FLOYD HAMPTON.
JOHN P. UMHOEFER.